United States Patent [19]
Mausy

[11] Patent Number: 6,109,837
[45] Date of Patent: Aug. 29, 2000

[54] PNEUMATIC CONVEYOR FOR SMALL METALLIC PIECES, PARTICULARLY COINS, FOR PAYMENT POINTS

[75] Inventor: Guy Mausy, Colomars, France

[73] Assignee: Snef Cote d'Azur (S.A.), Nice, France

[21] Appl. No.: 08/952,929

[22] PCT Filed: May 28, 1996

[86] PCT No.: PCT/FR96/00798

§ 371 Date: Nov. 27, 1997

§ 102(e) Date: Nov. 27, 1997

[87] PCT Pub. No.: WO96/38823

PCT Pub. Date: Dec. 5, 1996

[30] Foreign Application Priority Data

Jun. 1, 1995 [FR] France ................................ 95 06507

[51] Int. Cl.⁷ ............................................... B65G 53/40
[52] U.S. Cl. ...................... 406/117; 406/116; 406/165; 406/166; 406/192; 406/182; 406/2; 406/3; 221/278; 221/211; 194/346
[58] Field of Search ............................ 406/117, 116, 406/31, 33, 165, 166, 192, 182, 2, 3, 127, 169; 221/278, 211; 194/346

[56] References Cited

U.S. PATENT DOCUMENTS

| | | | |
|---|---|---|---|
| 683,666 | 10/1901 | Shannon | 406/127 |
| 1,048,477 | 12/1912 | Allington | 406/182 |
| 2,390,147 | 8/1945 | Hatton | 194/346 |
| 3,260,285 | 7/1966 | Vogt | 406/192 |
| 3,367,603 | 2/1968 | Feyerherd | 406/127 |
| 3,419,209 | 12/1968 | Munn | 232/1 |
| 3,759,577 | 9/1973 | Manzer | 302/2 |
| 3,979,054 | 9/1976 | Graham | 232/43.2 |
| 4,078,498 | 3/1978 | Futer | 104/155 |
| 4,131,318 | 12/1978 | Deem | 302/2 |
| 4,334,604 | 6/1982 | Davies | 194/100 |
| 4,481,019 | 11/1984 | Moreno | 406/127 |
| 4,562,419 | 12/1985 | Preuss et al. | 335/195 |
| 4,757,941 | 7/1988 | Hosterman et al. | 232/16 |
| 4,998,610 | 3/1991 | Said et al. | 194/318 |
| 5,016,745 | 5/1991 | Schoeb et al. | 194/346 |
| 5,746,299 | 5/1998 | Molbak et al. | 194/200 |

FOREIGN PATENT DOCUMENTS

| | | | |
|---|---|---|---|
| 2639336 | 5/1990 | France . | |
| 1 944 979 | 3/1970 | Germany . | |
| 2 272 414A | 5/1994 | United Kingdom | 406/3 |

*Primary Examiner*—Christopher P. Ellis
*Assistant Examiner*—Richard Ridley
*Attorney, Agent, or Firm*—Young & Thompson

[57] ABSTRACT

In a pneumatic conveyor for coins comprising a plurality of conduits leading from a plurality of payment points, a common conduit into which said plurality of conduits feed, a separator receiving coins from said common conduit and separating said coins from air, suction means for creating a suction in said common conduit and said plurality of conduits to convey coins to said separator, and a storage receptacle for receiving coins from said separator; the improvement comprising a sealing means for opening and closing concealing means disposed in each of said plurality of conduits for opening each of said plurality of conduits only when a coin enters one of said plurality of conduits and for closing the associated said one of said plurality of conduits after said coin has passed said sealing means, thereby to preserve said vacuum both in said plurality of conduits downstream of said sealing means and in said common conduits.

4 Claims, 10 Drawing Sheets

PNEUMATIC CONVEYOR FOR SMALL METALLIC PIECES, PARTICULARLY COINS, FOR PAYMENT POINTS

The invention has for its object a pneumatic conveyor for small metallic pieces, particularly coins, for payment points.

The payment point can be particularly a toll road machine, a parking machine, a machine below gaming halls or any other apparatus receiving money and adapted to be emptied by a pneumatic conveyor line.

The status of the art can be defined by the following patents:

FR-A-2.639.336: Conveyor of the pneumatic type for transporting solid objects such as coins, comprised by a suction tube at the intake, a suction turbine, a tube for discharging air toward the exterior, a storage located below the normal point for recovering the pieces, said storage having the function of freeing by gravity the pieces in a random fashion; a suction tube connects the reception box to an assembly of separation boxes; at the end of said tube are disposed movable boxes for reception, storage and handling of the conveyed articles; said conveyors characterized by the fact that it comprises a box which serves as a flow regulator, and that the assembly of said separation boxes serves as a blockage to separate the conveyed articles from the circuit under vacuum, said assembly is disposed at the downstream end of the suction tube.

FR-A-2.703.665: pneumatic conveyor for the transfer of solid objects, such as coins, of the type using a pneumatic transport line disposed between at least two reception and storage chambers for solid objects, supplied directly by gravity or by another transfer means of said solid objects, from at least one payment point, a storage volume or a blockage maintains the vacuum created by a suction turbine whilst freeing the solid objects and at least one machine to count the money.

The conveyor comprises:
- a movable receptacle mounted slidably on a rolling track such as a rail, so as to be displaceable under the fixed reception and storage containers,
- said receptacle is connected to the pneumatic transport line by means of a flexible tube, and
- each fixed receptacle is provided with a trap operable manually or remotely by a control means.

These patents describe essentially a transport device using a line from a payment point and continuous evacuation. The device for introduction into the payment point is reduced to a funnel adapted to introduce the pieces into the tube.

This embodiment has the drawback of being costly to install by the large number of tubes necessary and to use because the lines are not used for more than a small percentage of their capacity.

U.S. Pat. No. 4,131,318: apparatus to collect pieces comprising a reception chamber and a suction system to permit suction toward the reception chamber. A plurality of internal holes are disposed on the upper wall of this chamber, and a conduit connects each internal hole to a source of separated and spaced pieces. Each plug, located at the level of each internal hole, has an upper inclined shape which, in the position of closure, permits individually blocking each internal hole. A solenoid is secured to each plug to move the plug upon countering a force which maintains it closed so as to permit communication between the conduit and the receptacle chamber. Mechanisms periodically activate the suction means and the solenoids.

In this patent, each payment point is provided with an introduction device each connected by a line for the apparatus for suction and receiving the pieces.

U.S. Pat. No. 3,759,577: pieces disposed in reception units for machines using pieces fall into distributor conduits communicating with reception units and a remote collection surface. The liquid moves continuously and periodicly through the tubes and moves the pieces through the tubes and to the reception surface at which the pieces are separated from the liquid.

This apparatus does not suck objects through a conduit. On the contrary, it pushes whilst blowing and injecting water. The conduits cannot be disposed at more than a gentle slope, or on the same level.

U.S. Pat. No. 4,078,498: a system of pneumatic transport at low pressure to move a vehicle or objects along a conduit having two ends without a door subjected to atmospheric pressure. Adjacent the inlet end of the conduit, several orifices in the form of slots for the Coanda effect are present at the closure of the conduit. A tube connects the orifices to blowing means and supplies air to the orifices.

The essence of this invention resides in the use of the Coanda effect. The apparatus acts by pushing the pieces and not by sucking them.

DE-A-1.944.979: the invention has for its object a device for stopping and braking for an installation with pneumatic tubes with extraction by suction.

The object of the invention is to produce a device capable of braking in a simple and certain fashion and without generating noise, a transport box arriving at a high speed. The same device must also be able to be used to retain a transport box at a predetermined place during the desired time.

This object is realized by the invention with the replacement of the conduit by a thick tube of resilient material, preferably of rubber. This tube at rest has the same section as the conduit and is contained in a sealed cavity which can be as desired placed in communication with the conduit or the outside atmospheric pressure. When the tube is at the outside pressure, its section decreases by the effect of suction and against the passage of the transport box, slowing its speed or as the case may be, stopping it.

The essential object of this device is to slow or stop boxes arriving at high speed. A branch line is provided to this end so as not to stop the air circulation.

The object of the invention is totally different. The valve according to the SNEF invention is used not to brake or block the passage but as a sealing valve. It opens only for the passage of the piece and closes immediately thereafter to avoid loss of charge. Thus, the invention resides equally in the fact that one or several payment points are connected to the same principal line.

The embodiment according to the invention is applicable particularly to payment points of the type of automatic game machines.

At present, in establishments in which coin machines are permitted, the transfers take place in the following manner: the coin machines are mounted on bases in which are emplaced buckets below the outlet opening for pieces from the coin machines. Periodically, employees collect the full buckets and replace them by empty buckets. Each coin machine can recover between 1000 and 3500 pieces per day, namely, between 15 and 30 Kg per day. This handling of the pieces is hence hard work, without counting the risks of "evaporation" of the receipts.

For this use, the pneumatic conveyor is therefore particularly adapted.

The pneumatic conveyor for small metallic pieces, particularly coins for payment points, is of the type using one or several lines, in which is created a vacuum by one or several suction turbines, each line recovers, at one end, the pieces from a payment point and at the other end opens into a means serving as a separator (air/pieces) connected to a suction turbine and a storage chamber, characterized by the fact that:

several payment points are connected to a same principal line, each payment point is provided with an introduction device with sealed opening and closing for each passage of pieces into the principal line, one or several principal lines are connected to each means serving as separator (air/pieces), each line is a tube whose diameter is defined as a function of the diameter of the pieces to be pneumatically conveyed and this so as to render unstable the position in the tube of a coin which is located momentarily stopped to promote its oscillation.

The introduction device is comprised:

of a detector of pieces which serves as a counting means and as a control means of a valve with sealed opening and closing, of a valve with sealed opening and closing of the line solely during passage of the piece, of a safety means which is actuated during disfunction of said introduction device to disengage, by rotation, the end of the line from the cutlet orifice of the pieces of the payment piece.

The valve with sealed opening and closing is a sleeve valve contained coaxially within the line. The closure element is constituted by a flexible sleeve which, under the influence of a small peripheral pressure, closes to obstruct completely the passage in the subjacent line under vacuum, for opening, an equivalent negative pressure is applied to the membrane or flexible sleeve.

The valve is constituted by a body having an internal chamber. The tubular membrane or flexible sleeve passes through this chamber. An opening is provided in the central portion of the body for supply of control air, via a three-way valve.

The safety means which is actuated during malfunction of the introduction device is comprised by an actuating means which displaces the end of the line to disengage the outlet opening for the pieces from the payment point.

The operating means is an electric motor. This embodiment is not shown and not described.

The operating means is the combination of an electromagnetic valve and a prestressed spring.

The safety means for the introduction device is constituted by a doubly bent tube whose two ends are parallel but offset, one of the downstream ends is introduced into the sleeve valve and pivots freely in it. The other upstream end is positioned directly below the outlet orifice of the payment point. An electromagnetic plunger maintains the end below the outlet of said payment point and this against a prestressed spring; when activated, said plunger is held against the field closure plate; when inactivated, said spring pivots the tube, letting the pieces fall by gravity into a safety box located directly below the tube. The supply of said valve is controlled by a malfunction detector.

According to another embodiment, the safety means is provided by a storage and counting assembly constituted by two principal elements, a storage container and a hopper for counting and ejecting the pieces. In operation, according to this safety measure, one of the two elements can pivot relative to the other so as to permit the evacuation of the pieces from one storage or counting assembly toward a safe.

According to a preferred embodiment, the hopper which serves as the counting element can pivot about an axis under the action of its own weight and of a traction spring. An electromagnet ensures maintaining it closed, whilst the voltage is maintained over each of its terminals. Means serving as a level detector verifies the filling of the storage container.

According to a preferred embodiment, the principal lines are tubes are high density polyethylene. The diameter (A) of the tube is a function of the diameter (B) of the metallic piece to be transported, namely:

$$1.3B < A < 2.3B$$

The tube has a diameter about twice that of the metallic piece.

According to a preferred embodiment, the diameter of the tube is 1.7 to 1.8 times greater than the diameter of the metallic piece.

According to one embodiment, the air flow is comprised between 8 and 16 meters/second.

The means serving as air/pieces separator, which is connected to a suction turbine and a storage chamber, is provided with a buffer volume which ensures separation of the pieces and the air under vacuum.

The storage volume has the shape of an inverted cone, the large base thus receiving, by this upper portion, a suction line connected to the suction turbine and one or several principal lines for transport of the pieces. The outlet of the principal line conveys the pieces, which fall by gravity and which are dampened by the wall of the storage volume, in a way serving as a screen. This screen means is not described.

According to a preferred embodiment, the suction line, connected directly to the suction turbine, arrives at the center of the storage volume whilst the principal lines are disposed in a circular array, about said suction conduit. The flow rate of the suction line is thus divided uniformly between the principal lines.

The accompanying drawings are given by way of indicative and non-limiting example. They show a preferred embodiment according to the invention. They will permit easy understanding of the invention.

Figure 1:
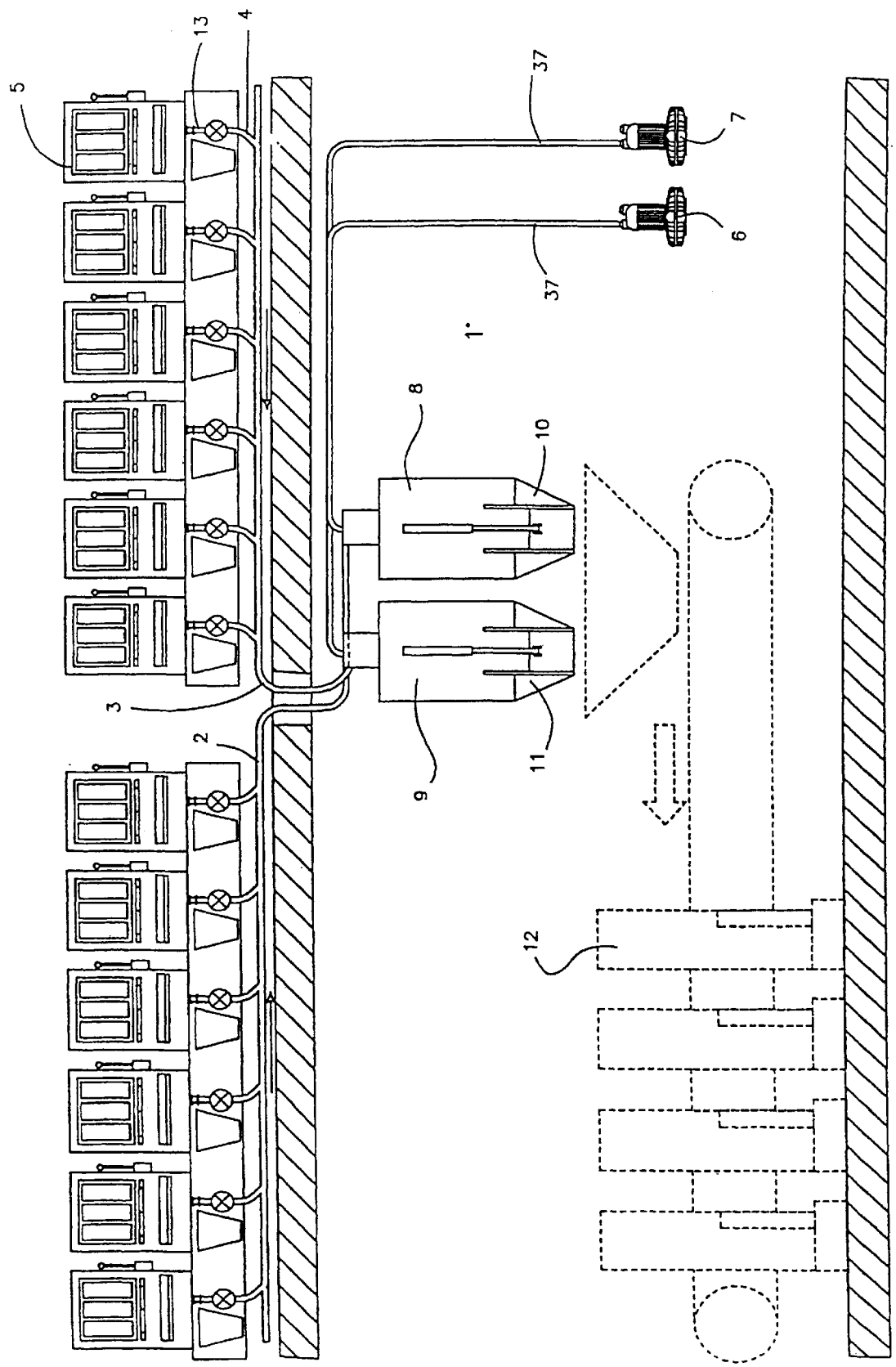
FIG. 1 is a schematic view of the assembly of the pneumatic conveyor for small pieces particularly coins for payment points, it shows particularly that several payment points are connected to a same principal line.
Figure 2:
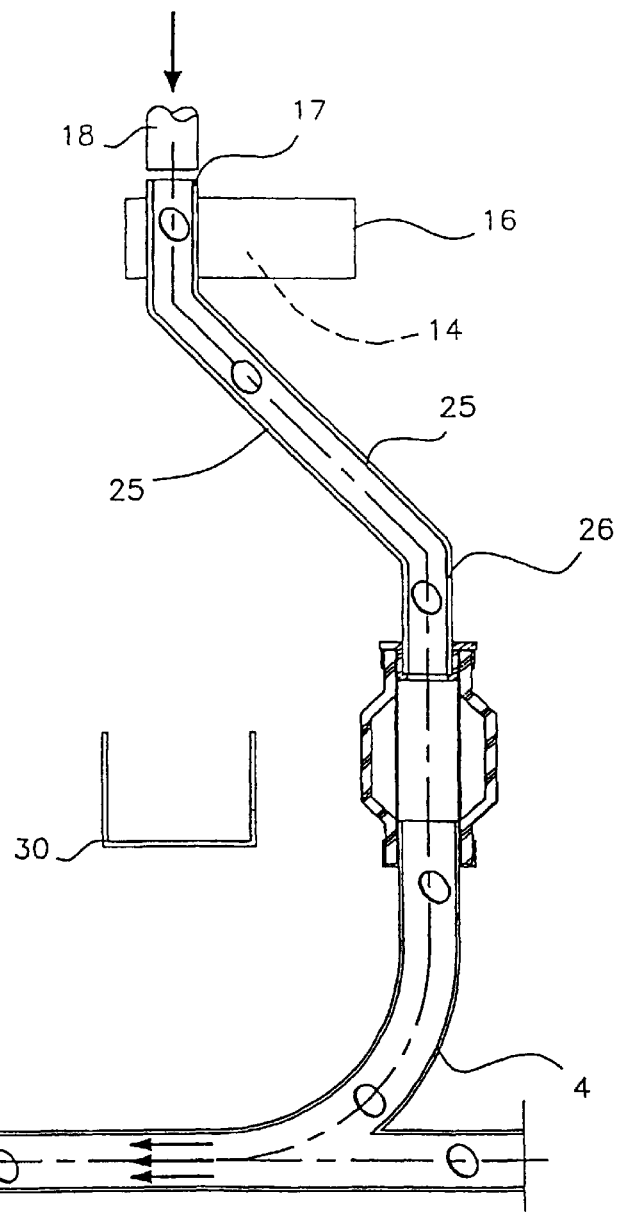
FIG. 2 is an assembly view of the introduction device comprised by a detector of pieces, a valve that opens and closes, a Y-shaped connection, a safety means provided to disengage, by rotation, the end of the line of the outlet opening for pieces from the payment point.
Figure 3:
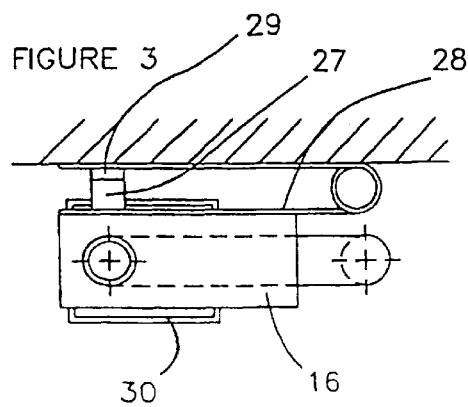
FIG. 3 is a view from above according to FIG. 2, in which the end of the line is below the outlet opening for the pieces from the payment point.
Figure 4:
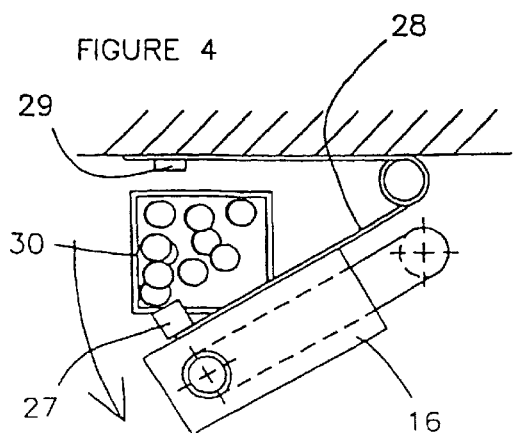
FIG. 4 is a view according to FIG. 3 but in which the safety means has disengaged, by rotation, the end of the line from the outlet opening of the pieces from the payment point.
Figure 5:
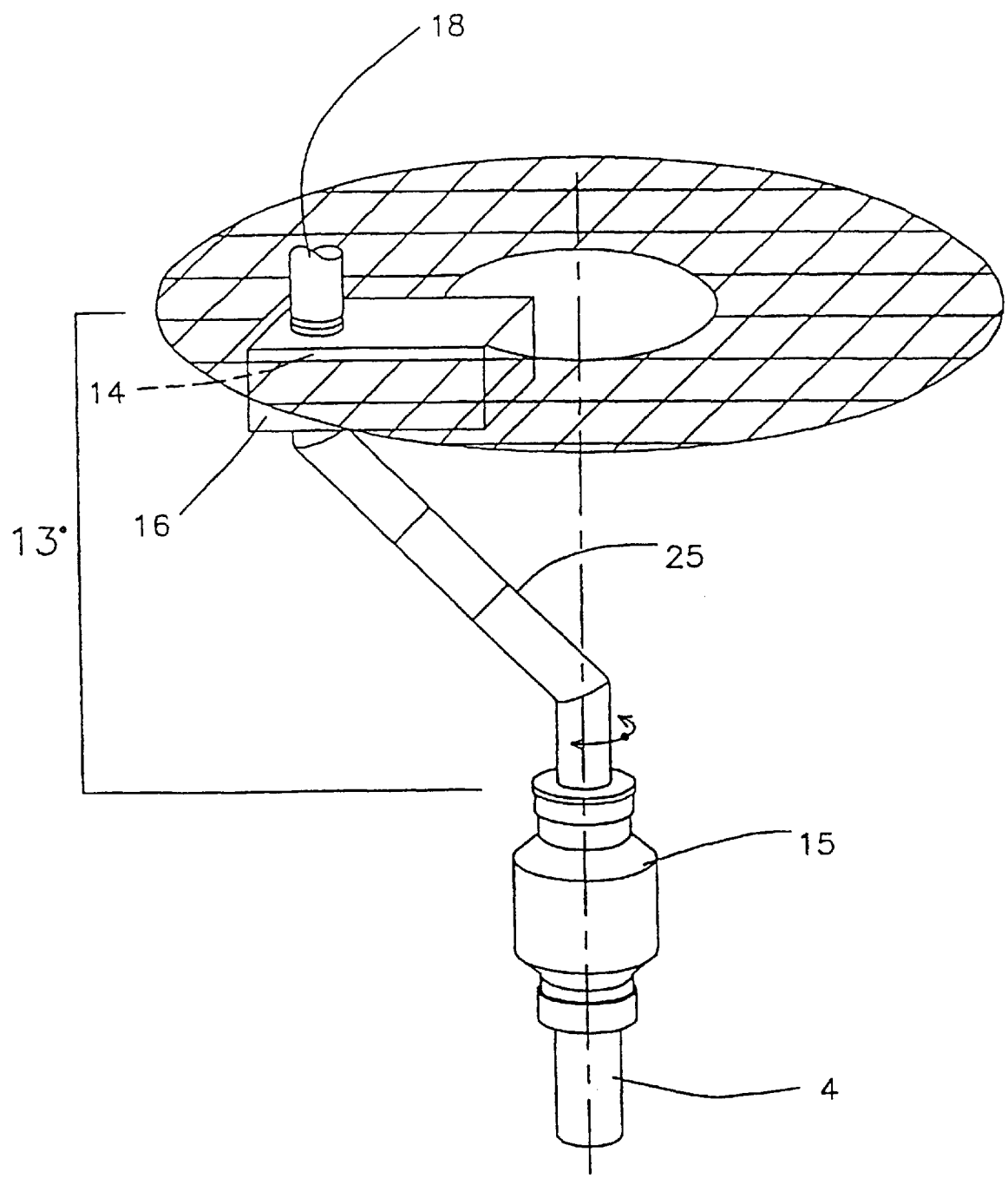
FIG. 5 is a schematic view of the introduction device showing the easy adaptability relative to the position of the ejection orifice for the pieces from the payment point.

The conveyor 1 is shown in FIG. 1.

In FIG. 1, the conveyor 1 uses two principal lines 2 and 3 which are connected, by Y branches 4, to payment points 5. Several payment points 5 are thus connected to a single principal line 2 or 3.

In the embodiment shown in FIG. 1, the payment points 5 are coin machines.

The suction is created by two suction turbines 6 and 7. Each suction turbine creates vacuum in a principal line 2 or 3.

The suction turbine 6 effects the vacuum in the principal line 2. The suction turbine 7 effects the vacuum in the principal line 3. Each principal line leads to a means serving as an air/pieces separator. The principal line 2 leads to an air/pieces separator 8. The principal line 3 leads to an air/pieces separator 9. Below the air/pieces separator 8 is located a storage container 10. Below the air/pieces separator 9 is located a storage container 11. Below the storage containers 10 and 11 are shown, in phantom line, the different members 12 which permit treating the different pieces and to control the pieces according to a predetermined manner.

Each payment point 5 is provided with an introduction device 13 having sealed opening and closing for each passage of the pieces in the principal line 2 or 3, to which the introduction device is connected by a Y connection 4.

Each line 2 or 3 is a tube whose diameter A is a function of the diameter B of the pieces 31 to be pneumatically conveyed and this so as to render unstable the position in the tube of the line of a piece 31 which is momentarily stopped to promote its oscillation.

The introduction device 13 is more particularly shown in FIGS. 2, 3, 4 and 5.

The introduction device 13 is comprised:
  of a detector for pieces 14 (not shown in the figures) which serves as a counting means and control means of a sleeve valve 15 with sealed opening and closing of the line, only during passage of the piece 31.
  a safety means 16 which is actuated during malfunction of said introduction device 13 to disengage, by rotation, the upstream end 17 of the Y connection 4 of the line. This end 17 is disengaged from the outlet opening 18 for the pieces from the payment point 5.

The valve 15 with sealed opening and closing is a sleeve valve 15 inserted coaxially in the derivation line 4 of Y shape The closure member is constituted by a flexible sleeve which, under the influence of low peripheral pressure, closes to shut completely the passage in the subjacent line under vacuum; to open, an equivalent negative pressure is applied to the flexible membrane or sleeve 19.

The sleeve valve 15 is constituted by a body 20 having an internal chamber 21. The tubular membrane or flexible sleeve 19 passes through this internal chamber 21.

Figure 6:
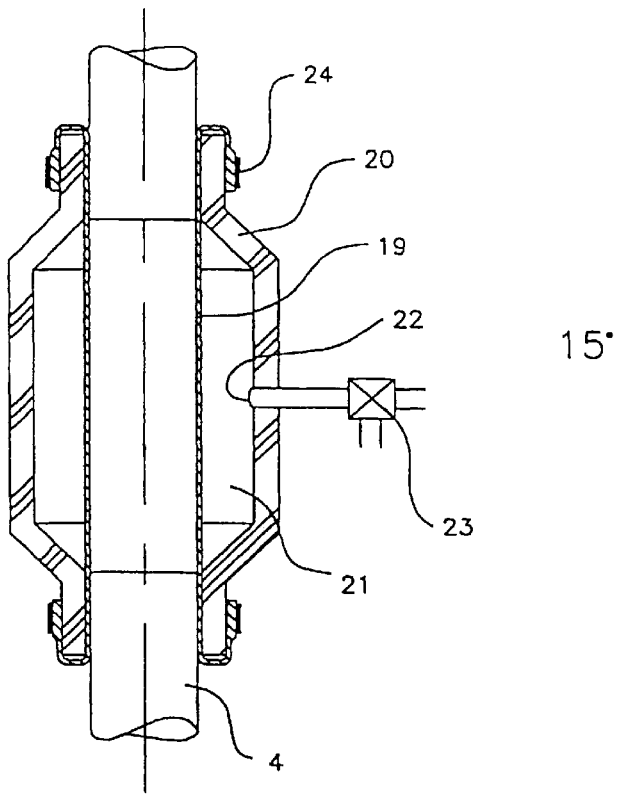
FIG. 6 is a view of the sleeve valve in its rest position.

An opening 22 is provided in a central portion of the body 20 to supply control air, by means of a three-way valve 23. In FIG. 6, the sleeve valves 15 is shown in a rest position without air supply.

The tubular membrane 19, in natural or synthetic rubber, passes through the internal chamber 21. The flexible membrane 19 has flanges at each of its ends, which flanges after returning on the body 20 receive gripping collars 24 which ensure the seal between the flexible membrane or tubular membrane 19 and the body 20 of the valve.

Figure 7:
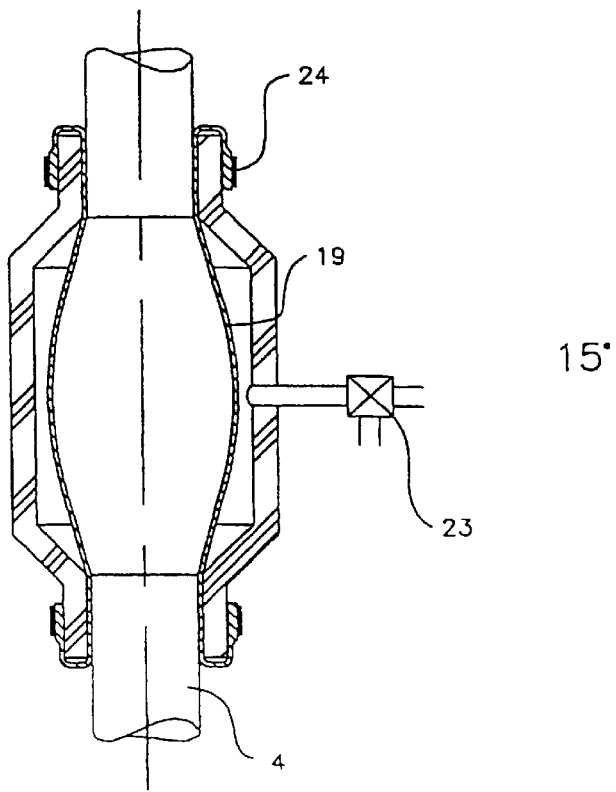
FIG. 7 is a view of the sleeve valve in the open position, the chamber being under suction. The tubular membrane enlarges to leave a free passage for the pneumatic transport of the line.

As shown in FIG. 7, the internal chamber 21 is placed under vacuum by swinging of the valve 23, the tubular membrane 19 enlarges to leave a free passage for pneumatic conveyance in line 4.

Figure 8:
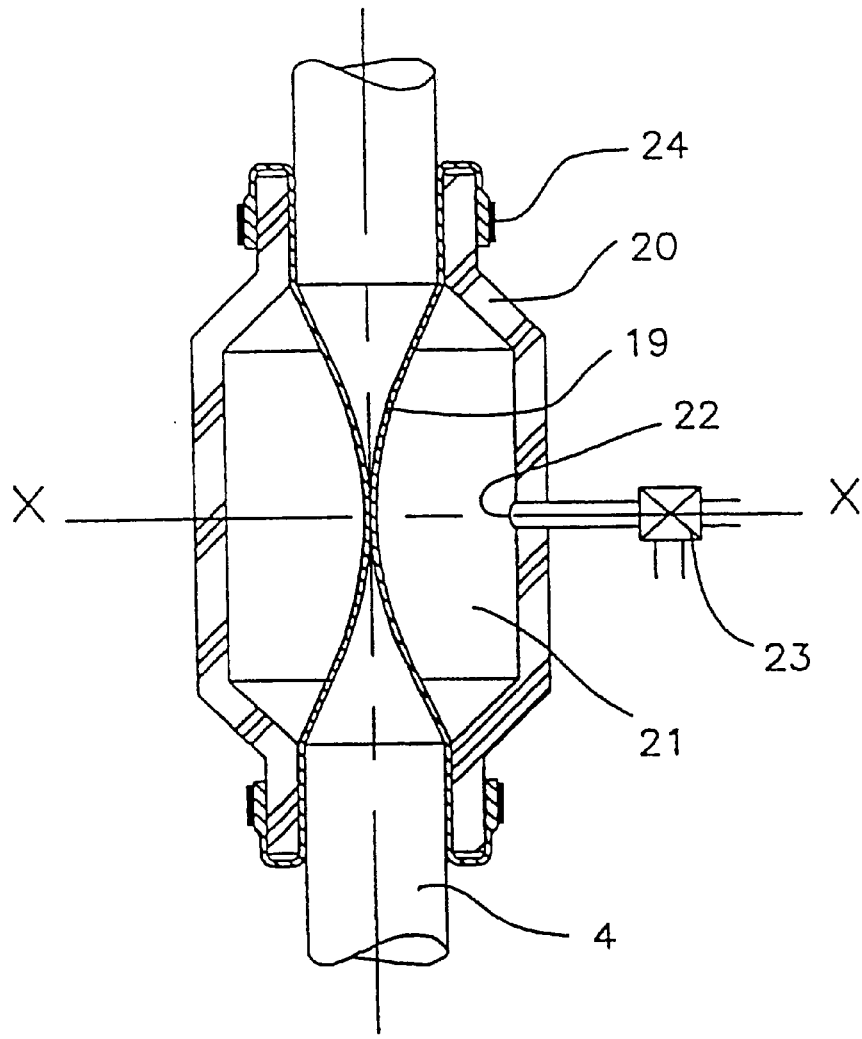
FIG. 8 is a view of the sleeve valve in the closed position, the chamber being under pressure.

In the closed position, as shown in FIG. 8, the internal chamber 21 is placed under positive pressure by swinging of the valve 23, that is, the three-way control valve.

The flexible sleeve or tubular membrane 19 is pinched, it thus shuts the pneumatic conveyance line 4.

Figure 9:
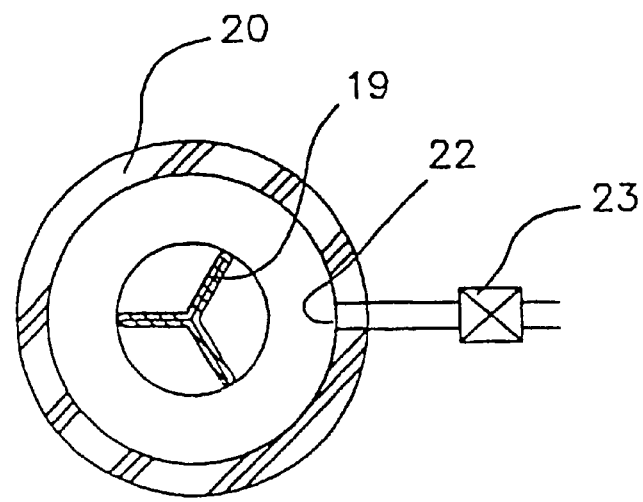
FIG. 9 is a cross-sectional view on the line X—X shown in FIG. 8, showing the pinching of the membrane which obstructs the pneumatic transport line.

FIG. 9 shows the three-lobed position adopted by the flexible sleeve or tubular membrane 19 in the closed position.

Safety means 16 of the introduction device 13 is comprised by a twice bent tube 25 whose two ends 17 and 26 are parallel but offset. One of these ends, the end 26, is introduced into the sleeve valve 15 and pivots therein freely.

The other end 17 is positioned directly below the ejection orifice 18 of the payment point 5.

An electromagnetic plunger 27 maintains the end 17 below the opening 18 of said point 5 and this against a pretensioned spring 28. When activated, said electromagnetic plunger 27 is applied against the closure plate of field 29. When inactivated, said spring 28 causes the end 17 of the tube to pivot, thereby letting the pieces fall by gravity into a vault 30 directly located below the opening 18 and in line therein.

The supply of the electromagnetic plunger 27 is controlled by a malfunction detector, not shown in the figures. Said detector must be at the same time able to detect a fault as to the vacuum, a fault as to the circulation of the pieces in the line, a blockage, etc.

Under these circumstances, in case of stopping or malfunction of the conveyor, the safety means 16 permits operating in a safety mode, which is to say that the pieces are taken directly from the outlet opening 18 for the pieces from the payment point 5, to the vault 30.

According to a preferred embodiment, the principal lines 2, 3 as well as the Y-shaped connection 4, are made of tubes of high density polyethylene.

The diameter A of the tube is a function of the diameter B of the coin to be transported, namely 1.3B<A<2.3B. Thus the tube or line 2 or 3 has a diameter about twice as great as the diameter B of the piece 31.

Figure 10:
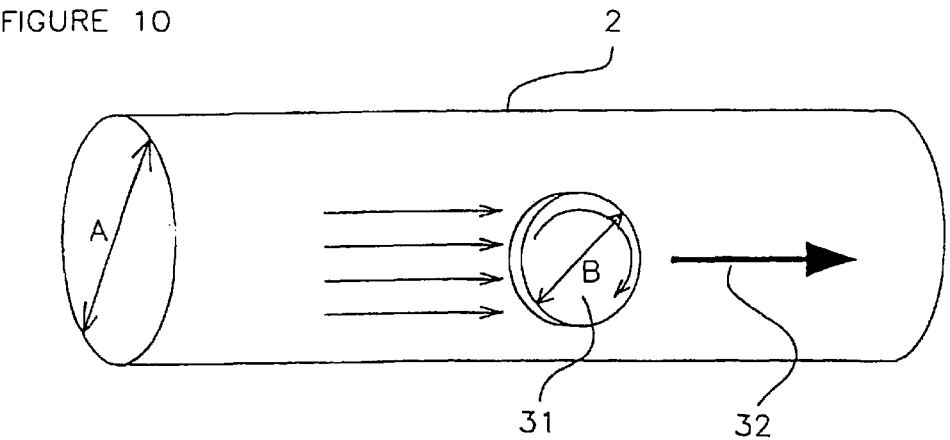
FIGS. 10, 11 and 12 show the relationship between the diameter of the tube and the diameter of the piece such that upon stopping, the piece will be near an unstable equilibrium.
Figure 11:
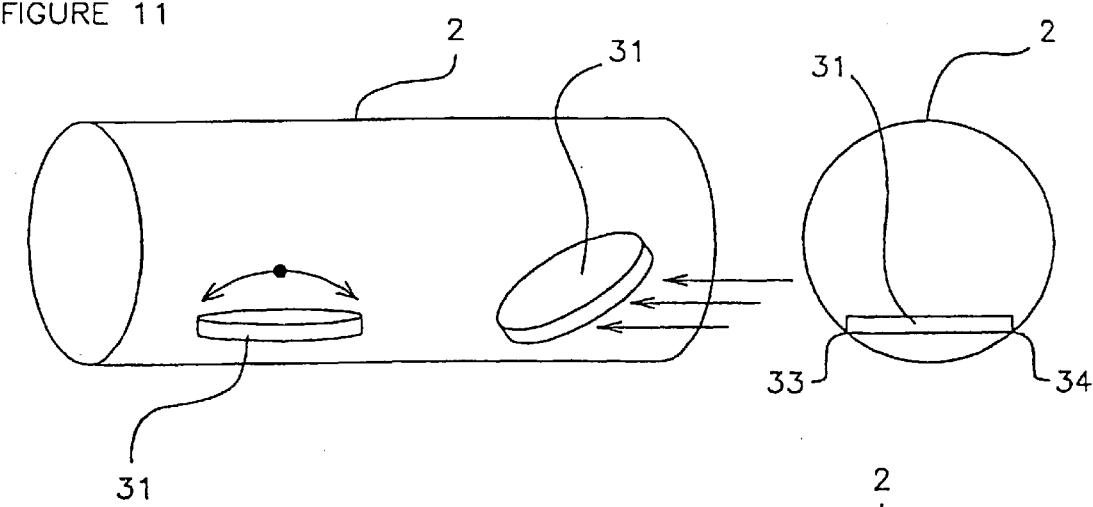
Figure 12:
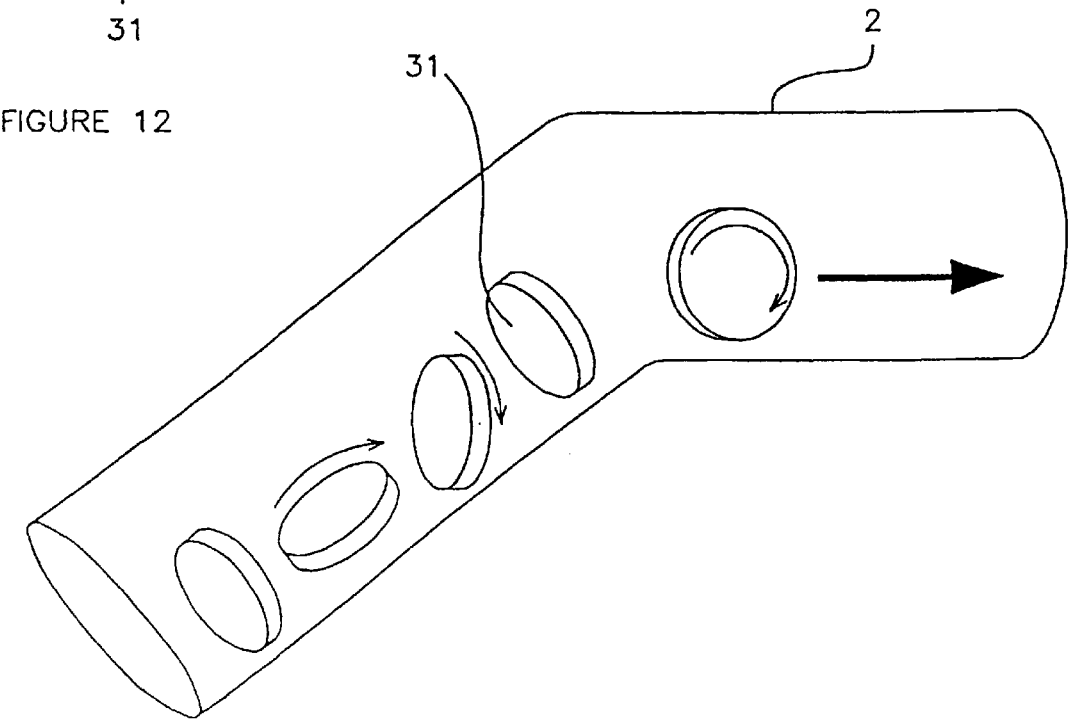

As shown in FIG. 10, the piece 31 rolls normally according to the indicated arrow 32, in the tube 2. If the piece 31 stops and lies down in the tube 2, for example by cutting the flow, this piece is not in contact with the tube 2 except at two points 33 and 34. The contact is hence very small between the piece 31 and the walls of the tube. As soon as the vacuum is reestablished in the line, the least disturbance causes the piece 31 to oscillate in the direction of flow, namely in the direction of the arrows.

This piece 31 then has a master couple sufficient to let it be propelled again by the air flow, if the latter is comprised within the values described above according to the invention and this so as to be able to propel said piece 31.

According to the present invention, the air flow is comprised between 8 and 16 meters/second.

Figure 13:
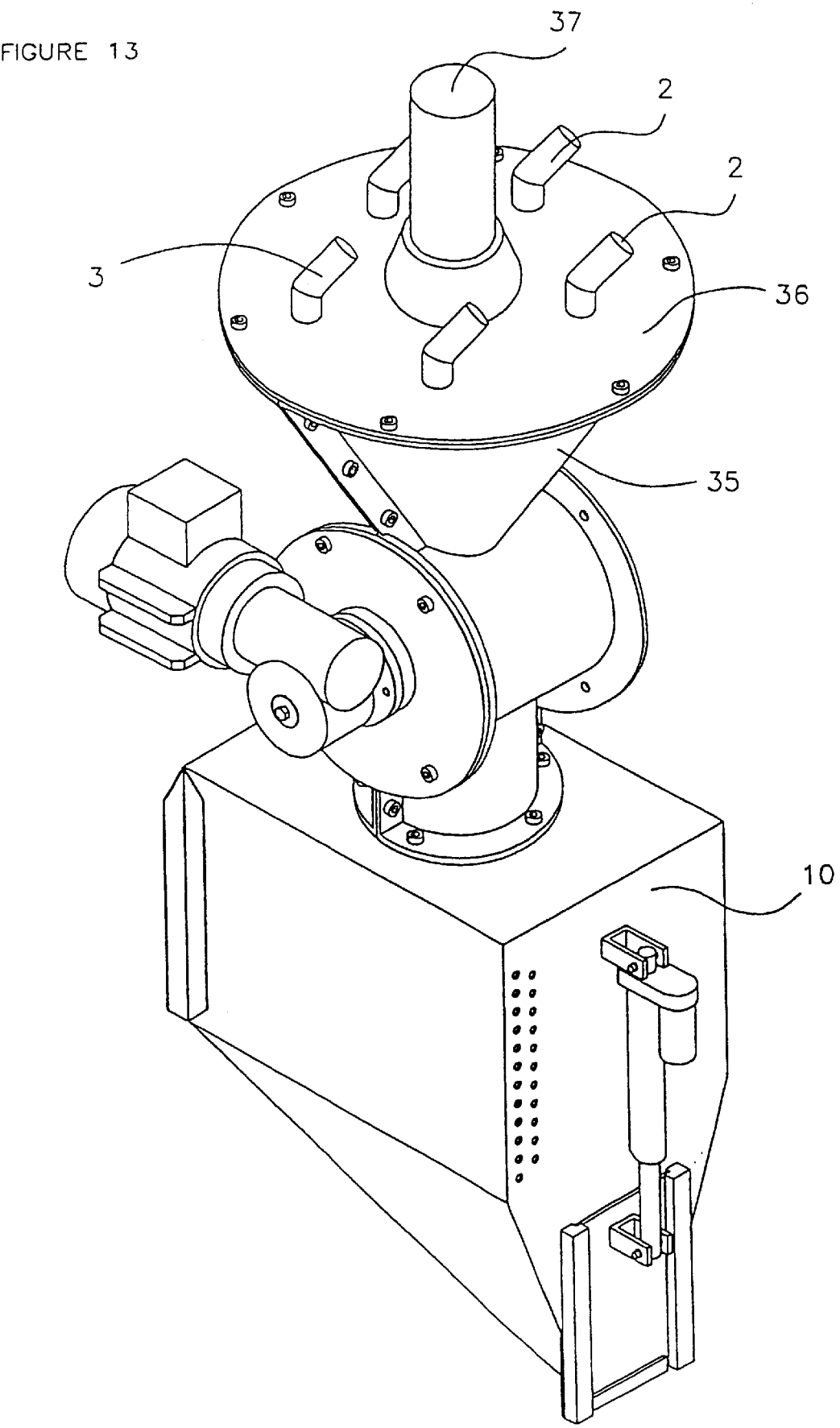
FIG. 13 is a perspective view of the means serving as an air/piece separator and of the storage box for the pieces.

The means serving as an air/pieces separator 8 or 9 is shown in FIG. 13. It is connected to a suction turbine 7 and to a storage container 10.

Said storage container is provided with a storage volume 35. The storage volume 35 has the shape of an inverted cone, the large base 36 receiving, at its center, a suction line 37 connected to the suction turbine 6 and the inlets of several principal conveyor lines distributed in a circular fashion about the suction opening. The flow from the suction line 37 is thus distributed uniformly between the principal lines.

The outlet of the storage volume 35 conducts the pieces 31 which fall by gravity and which are shock absorbed by the wall of the volume 35 in a storage container 10.

Figure 14:
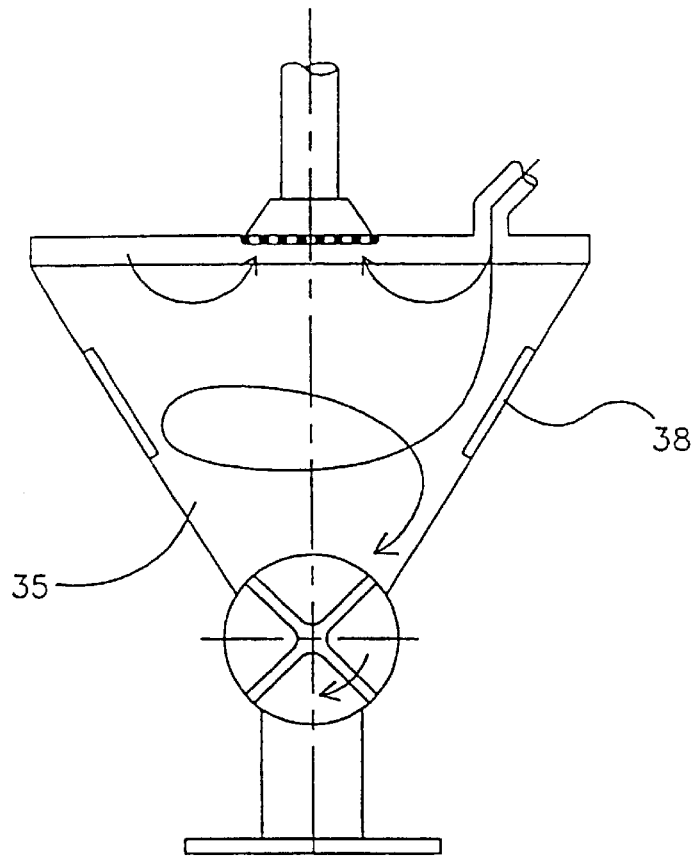
FIG. 14 is a schematic view as seen in longitudinal cross section, of the separator shown in FIG. 13.
Figure 15:
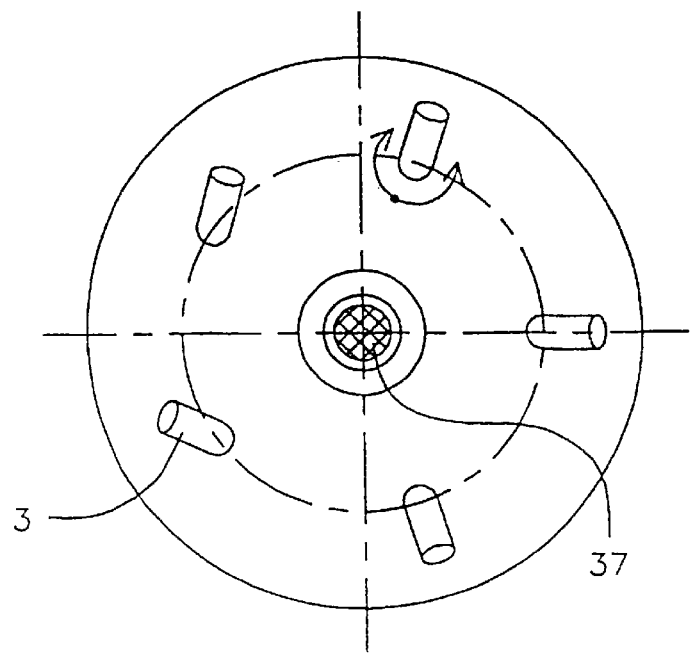
FIG. 15 is a view from above of the separator, showing the position of the arrivals from the principal lines and from the suction line directly connected to the turbine.

FIGS. 14 and 15 show the inlet of the suction line and the principal lines in the storage volume 35. They also show, by arrows, the flow of suctioned air and the path of the pieces which are shock absorbed by the wall of the storage volume 35, by the absorption strips disposed along the internal wall of said storage volume 35.

Figure 16:
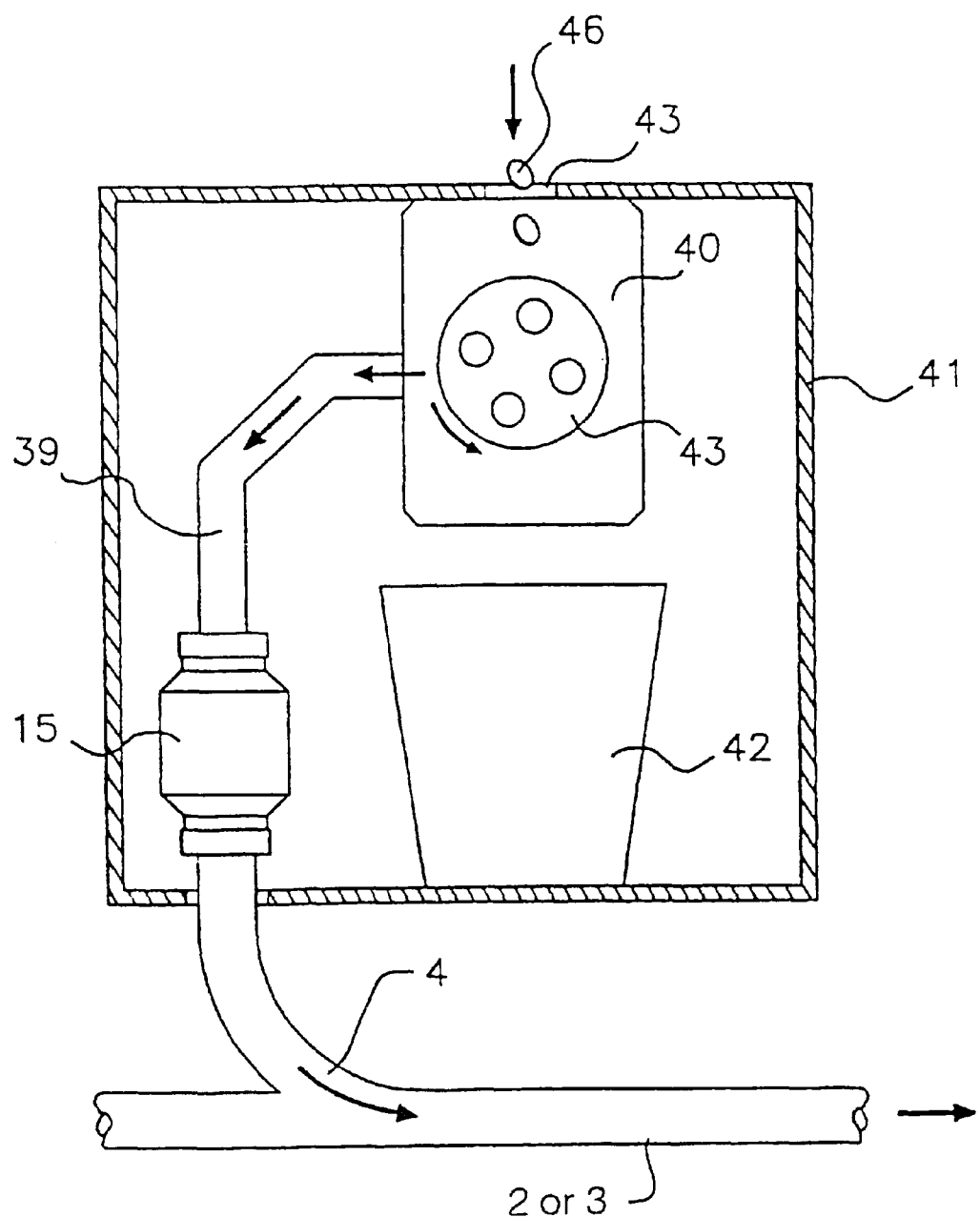
FIG. 16 is an assembly view of another embodiment of the introduction means which comprises an assembly for storing and counting.
Figure 17:
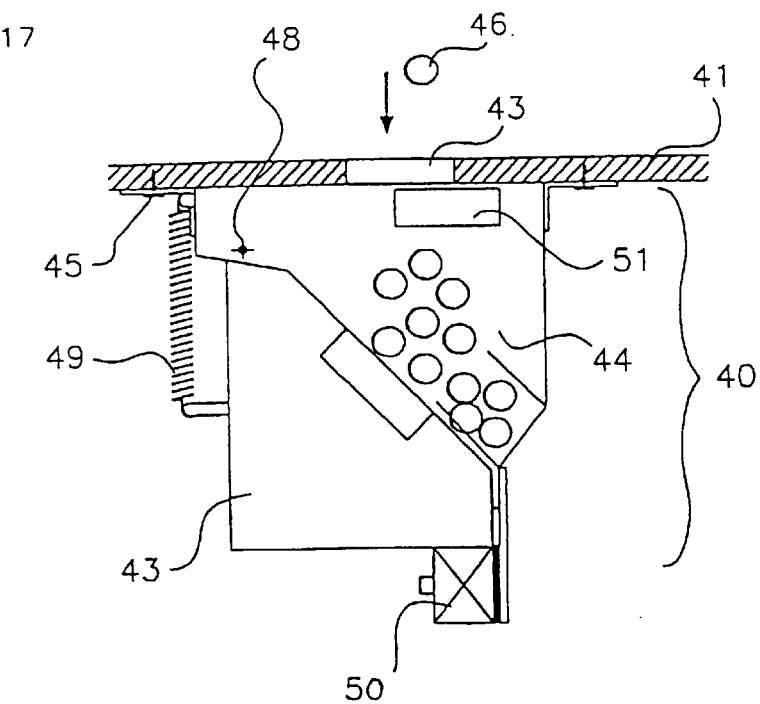
FIG. 17 is a detailed view of the storage and counting assembly in the operative position.
Figure 18:
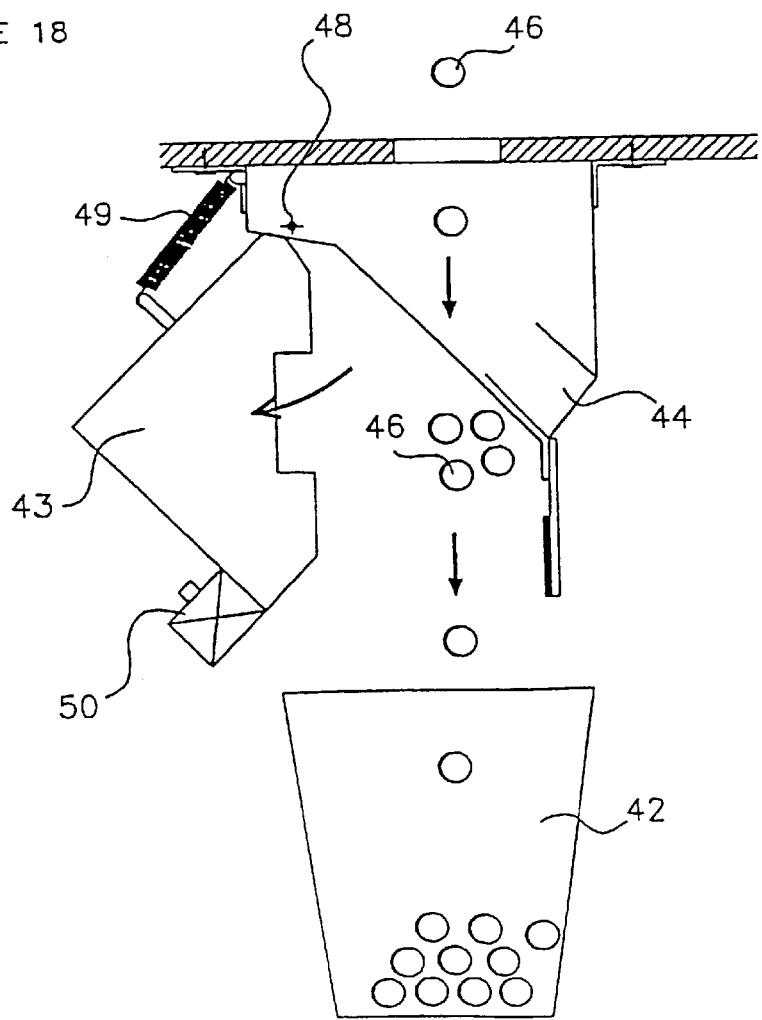
FIG. 18 is a detailed view of the assembly for storage and counting in a safety position, which is to say when the safety means has been actuated.

In the embodiment shown in FIGS. 16, 17, 18, the safety means is comprised by a conveying line 2 or 3 connected by a Y-shaped connector 4 to a sleeve valve 15, a connection tube 39 and a storing/counting assembly 40.

This assembly is fixed in a base 41 of a coin machine. A bucket 42 serving as a safety chest is disposed below the storage/counting assembly 40.

The pieces 46 constituting the receipts of the casino enter by gravity the storage/counting assembly 40 through an opening 43 in the base 41.

The pieces accumulate in the storage/counting assembly 40. At a certain time, the hopper 43 of the storage/counting assembly 40 starts to move, carrying out counting of the stored pieces, and ejects them into the connection tube 39.

Simultaneously, the valve 15 opens, and the pieces arrive in the line 2 or 3 of the pneumatic transport. When the storage/counting assembly 40 is empty, the hopper 43 stops, and a new filling cycle can begin.

As seen from the side, the storage/counting assembly 40 is constituted by two principal elements: a storage bowl 44, a hopper 43 for counting and ejecting the pieces.

The bowl 44 is fixed to the base 41 by screwing 45. The pieces 46 pass through the opening 47 and fill the bowl 44.

The hopper 43 can pivot about an axle 48 under the influence of its own weight and a traction spring 49. An electromagnet 50 ensures maintenance of the closure, whilst the voltage is maintained on each of its terminals.

A level detector 51 verifies the filling of the bowl 44.

In case of cutting the current to the terminals of the electromagnet 50, the hopper 43 pivots about the axle 48, the pieces 46 present in the bowl 44 fall into the bucket 42.

The coin machine can continue to function with the vault 42.

REFERENCES

1. Conveyor
2. Principal lines
3. Principal lines
4. Y-shape connector
5. Coin machines or payment points
6. Suction turbine
7. Suction turbine
8. Air/pieces separator
9. Air/pieces separator
10. 11. Storage container
12. Members for treating and controlling the pieces
13. Introduction device
14. Piece detector
15. Sleeve valve
16. Safety means
17. Upstream end of the Y connection of line 4
18. Outlet opening for the pieces from the payment point
19. Flexible sleeve or tubular membrane
20. Valve body
21. Internal chamber
22. Opening
23. Three-way control valve
24. Gripping collar for the flexible sleeve
25. Double bent tube
26. Downstream end of the twice bent tube
27. Electromagnetic plunger
28. Prestressed spring
29. Field closure plate
30. Vault
31. Metal piece
32. Arrow
33. 34. Points of contact of the piece with the tube of the line
35. Storage volume
36. Upper portion of the large base of the storage volume
37. Suction line
38. Absorption strips
39. Connection tube
40. Storing/counting assembly
41. Base
42. Vault or bucket
43. Hopper
44. Storage bowl
45. Screw threading
46. Pieces
47. Openings
48. Axle
49. Traction spring
50. Electromagnet
51. Level detector
A. Tube diameter
B. Piece diameter

What is claimed is:

1. In a pneumatic conveyor for coins, comprising a plurality of conduits leading from a plurality of payment points, a common conduit into which said plurality of conduits feed, a storage receptacle receiving coins from said common conduit, a suction means for creating a suction in said common conduit and said plurality of conduits to convey coins to said storage receptacle, a sealing means for opening and closing said plurality of conduits, said sealing means being disposed in each of said plurality of conduits for individually opening each of said plurality of conduits only when a coin enters one of said plurality of conduits and for closing the associated said one of said plurality of conduits after said coin has passed said sealing means, thereby preserving said suction both in said plurality of conduits downstream of said sealing means and in said common conduit, a safety means actuated during malfunction of said sealing means to swing an associated one of said plurality of conduits away from the associated said payment point, and a receiving means for receiving coins from the associated payment point when the associated said one conduit is thus swung; wherein a portion of each one of said plurality of conduits is angled and is mounted for rotation about the lower end of said portion, whereby the upper end of said portion swings horizontally into and out of registry with the associated said payment point.

2. A pneumatic conveyor as claimed in claim 1, further comprising a coin detector in each of said plurality of conduits upstream of said sealing means, said sealing means individually responding to the presence of a coin detected by said coin detector to open to permit a passage of said coin through said sealing means.

3. A pneumatic conveyor as claimed in claim 1, wherein said sealing means comprises a flexible sleeve, and means selectively to apply or release pneumatic pressure to said flexible sleeve thereby selectively to close or open said flexible sleeve.

4. A pneumatic conveyor as claimed in claim 3, wherein said flexible sleeve is disposed in and passes through a chamber within which pressure is varied so as to open or close said sleeve.

* * * * *